(12) United States Patent
Mattos et al.

(10) Patent No.: US 11,101,673 B2
(45) Date of Patent: Aug. 24, 2021

(54) PROGRAMMABLE GATE DRIVER CONTROL IN USB POWER DELIVERY

(71) Applicant: Cypress Semiconductor Corporation, San Jose, CA (US)

(72) Inventors: Derwin Mattos, San Mateo, CA (US); Hamid Khodabandehlou, Milpitas, CA (US); Sumeet Gupta, San Jose, CA (US); Syed Raza, San Jose, CA (US); Anup Nayak, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/983,895

(22) Filed: May 18, 2018

(65) Prior Publication Data
US 2019/0288532 A1    Sep. 19, 2019

Related U.S. Application Data

(60) Provisional application No. 62/642,282, filed on Mar. 13, 2018.

(51) Int. Cl.
*H02J 7/00*    (2006.01)

(52) U.S. Cl.
CPC ............. *H02J 7/0034* (2013.01); *H02J 7/00* (2013.01); *G06F 2213/0042* (2013.01); *H02J 7/00034* (2020.01); *H02J 7/00304* (2020.01); *H02J 2207/20* (2020.01)

(58) Field of Classification Search
CPC .................. H02J 7/0034; H02J 7/0052; H02J 2007/0059; H02J 2007/0062
See application file for complete search history.

(56) References Cited

U.S. PATENT DOCUMENTS

| | | | |
|---|---|---|---|
| 5,013,940 A * | 5/1991 | Ansel ............... | H03K 19/00361 326/15 |
| 6,072,681 A * | 6/2000 | Cogan .................... | H02H 5/042 361/100 |
| 7,479,770 B2 | 1/2009 | Kohout et al. | |
| 8,892,914 B2 | 11/2014 | Huynh | |
| 9,727,123 B1 | 8/2017 | Nayak et al. | |
| 9,740,261 B2 | 8/2017 | Waters et al. | |

(Continued)

FOREIGN PATENT DOCUMENTS

WO    2017199772 A1    11/2017

OTHER PUBLICATIONS

"PTN5100 USB Type-C power delivery PHY and protocol IC", Rev 1.1, NXP Semiconductors, Jul. 25, 2017; 53 pages.

(Continued)

*Primary Examiner* — Thienvu V Tran
*Assistant Examiner* — Bart Iliya

(57) ABSTRACT

Techniques for control of power switches in a USB Power Delivery (USB-PD) system are described herein. In an example embodiment, an integrated circuit comprises a programmable gate control circuit coupled to a provider field effect transistor (FET) and a consumer FET to provide control signals to the provider and consumer FETs in response to system conditions and application requirements of the USB-PD system. A pulldown current control circuit may provide additional control to slew rate for the slow turn-ON of provider and consumer FETs.

22 Claims, 10 Drawing Sheets

(56) References Cited

U.S. PATENT DOCUMENTS

| | | |
|---|---|---|
| 9,755,449 B2 | 9/2017 | Nge et al. |
| 2005/0040791 A1* | 2/2005 | Chesnau ............... H02J 7/0072 |
| | | 320/128 |
| 2011/0115541 A1* | 5/2011 | Barrow ............... H03K 19/0008 |
| | | 327/333 |
| 2014/0369085 A1* | 12/2014 | Motoki ................... G06F 1/266 |
| | | 363/21.12 |
| 2016/0118880 A1* | 4/2016 | Motoki ................ H02M 3/156 |
| | | 323/282 |
| 2017/0140887 A1* | 5/2017 | Waters ............. G01R 19/16576 |
| 2017/0220090 A1 | 8/2017 | Kim |
| 2017/0293335 A1* | 10/2017 | Dunstan .................. G06F 1/266 |
| 2017/0317583 A1 | 11/2017 | Forghani-zadeh et al. |
| 2017/0336844 A1 | 11/2017 | Koga |
| 2017/0351638 A1 | 12/2017 | Chen et al. |
| 2018/0060261 A1 | 3/2018 | Chhor et al. |
| 2018/0152035 A1* | 5/2018 | Li ......................... H02J 7/0021 |
| 2018/0219399 A1* | 8/2018 | Balakrishnan .... H02J 7/007184 |

OTHER PUBLICATIONS

"TPS65983B USB Type-C and USB PD Controller, Power Switch, and High Speed Multiplexer", Texas Instruments, Oct. 2016, Revised Jun. 2018, 116 pages.

"Type-C USB Power Delivery Controller—BM92T30MWV", ROHM Semiconductor, retrieved Jul. 5, 2018, 5 pages. www.rohm.com/products/interface/usb-type-c-power-delivery/controller/bm92t30mwv-product.

International Search Report for international application No. PCT/US19/20773 dated Mar. 25, 2019, 2 pages.

Written Opinion of the International Searching Authority for international application No. PCT/US19/20773 dated Mar. 25, 2019, 4 pages.

\* cited by examiner

PROGRAMMABLE GATE DRIVER CONTROL IN USB POWER DELIVERY

PRIORITY

This application claims the priority and benefit of U.S. Provisional Application No. 62/642,282, filed on Mar. 13, 2018, which is incorporated by reference herein in its entirety.

TECHNICAL FIELD

This disclosure relates to integrated circuits that control power delivery to electronic devices.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Thus, under certain power delivery conditions, the provided voltages/currents may need to be discharged quickly, but this may expose the integrated circuit device that controls the provision of such voltages/currents to heating and latch-up. Similarly, charge and discharge rates through power switches may need to be controlled for optimal system performance or to respond to fault conditions.

DETAILED DESCRIPTION

Figure 1:
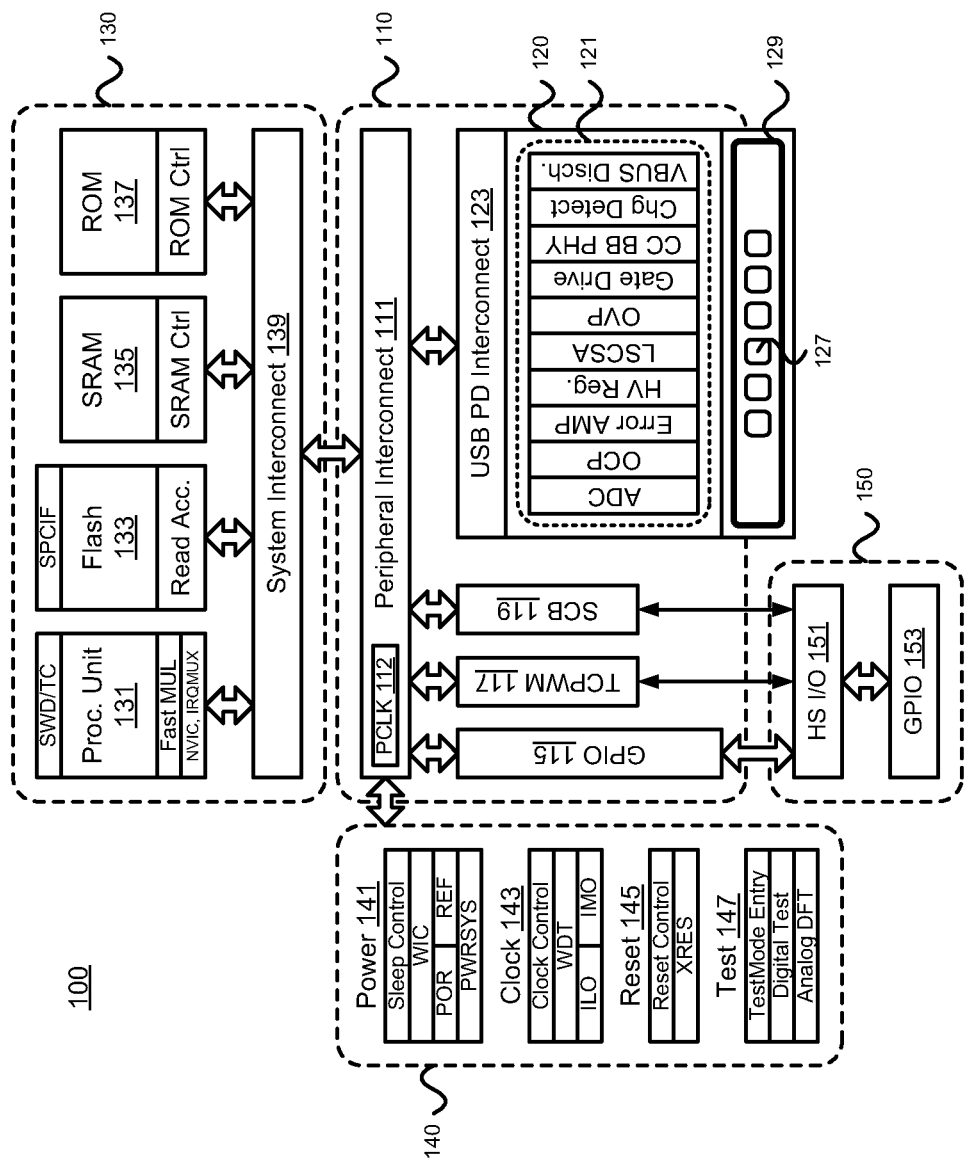
FIG. 1 illustrates a system for a USB device for use in USB power delivery in accordance with some embodiments.

The following description sets forth numerous specific details such as examples of specific systems, components, methods, and so forth, in order to provide a good understanding of various embodiments of the techniques described herein for control of power switches (also called power FETs) in USB power delivery. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for control of power switches (also called power FETs) coupled to power lines in electronic devices in USB-PD. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery.

A USB-enabled electronic device or a system may comply with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D– or DN), and a ground line for power return (denoted GND). A USB 3.0 port also provides the VBUS, D+, D–, and GND lines for backward compatibility with USB 2.0. In addition, to support a faster differential bus (the USB SuperSpeed bus), a USB 3.0 port also provides a differential pair of transmitter data lines (denoted SSTX+ and SSTX–), a differential pair of receiver data lines (denoted SSRX+ and SSRX–), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D–, GND, SSTX+, SSTX–, SSRX+, and SSRX– lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D– lines (DN1 and DN2), two SSTX+ lines (SSTXP1 and SSTXP2), two SSTX– lines (SSTXN1 and SSTXN2), two SSRX+ lines (SSRXP1 and SSRXP2), two SSRX– lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an AC power adapter or from another AC source. Thus, as part of an AC-to-DC conversion, some implementations may use a large bulk capacitor on the power source side of the VBUS line in order to remove the AC component of the power signal. Such bulk capacitor can be quite large (e.g., 1 mF to 6 mF) and the discharge thereof may cause very high currents on the VBUS line with risk of heating and IC controller latch-up. Under certain conditions a USB-PD power source is required to discharge the bulk capacitor (on the power source side) and the voltage on the power sink side of the VBUS line very quickly. However, it is not trivial to quickly discharge the voltage on the VBUS line by using an IC controller, given that the VBUS line may carry up to 5 A of current at up to 20V, for a total of up to 100 W of power. Turn-ON and turn-OFF of power switches (also referred to as power FETs) may allow for further circuit protection based on analysis of current and voltage conditions and the detection of faults.

FIG. 1 illustrates a system 100 for a USB device for use in USB power delivery. System 100 may include a peripheral subsystem 110 including a number of components for use in USB Power Delivery (USB-PD). Peripheral subsystem 110 may include a peripheral interconnect 111 including a clocking module, peripheral clock (PCLK) 112 for providing timing signals to the various components of peripheral subsystem 110. Peripheral interconnect 111 may be a peripheral bus, such as a single-level or multi-level advanced high-performance bus (AHB), and may provide a data and control interface between peripheral subsystem 110, CPU subsystem 130, and system resources 140. Peripheral interconnect 111 may include controller circuits, such as direct memory access (DMA) controllers, which may be programmed to transfer data between peripheral blocks without input by, control of, or burden on CPU subsystem 130.

The peripheral interconnect 111 may be used to couple components of peripheral subsystem 110 to other components of system 100. Coupled to peripheral interconnect 111 may be a number of general purpose input/outputs (GPIOs) 115 for sending and receiving signals. GPIOs 115 may include circuits configured to implement various functions such as pull-up, pull-down, input threshold select, input and output buffer enabling/disable, single multiplexing, etc. Still other functions may be implemented by GPIOs 115. One or more timer/counter/pulse-width modulator (TCPWM) 117 may also be coupled to the peripheral interconnect and include circuitry for implementing timing circuits (timers), counters, pulse-width modulators (PWMs) decoders, and other digital functions that may operate on I/O signals and provide digital signals to system components of system 100. Peripheral subsystem 111 may also include one or more serial communication blocks (SCBs) 119 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 110 may include a USB power delivery subsystem 120 coupled to the peripheral interconnect and comprising a set of USB-PD modules 121 for use in USB power delivery. USB-PD modules 121 may be coupled to the peripheral interconnect 111 through a USB-PD interconnect 123. USB-PD modules 121 may include an analog-to-digital conversion (ADC) module for converting various analog signals to digital signals; an error amplifier (AMP) for controlling the power source voltage allied to the VBUS line per a PD contract; a high-voltage (HV) regulator for converting the power source voltage to a precise voltage (such as 3.5-5V) to power system 100; a low-side current sense amplifier (LSCSA), an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 121 may also include a charger detection module for determining that a charging circuit is present and coupled to system 100 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 120 may also include pads 127 for external connections and electrostatic discharge (ESD) protection circuitry 129, which may be required on a Type-C port.

GPIO 115, TCPWM 117, and SCB 119 may be coupled to an input/output (I/O) subsystem 150, which may include a high-speed (HS) I/O matrix 151 coupled to a number of GPIOs 153. GPIOs 115, TCPWM 117, and SCB 119 may be coupled to GPIOs 153 through HS I/O matrix 151.

System 100 may also include a central processing unit (CPU) subsystem 130 for processing commands, storing program information, and data. CPU subsystem 130 may include one or more processing units 131 for executing instructions and reading from and writing to memory locations from a number of memories. Processing unit 131 may be a processor suitable for operation in an integrated circuit (IC) or a system-on-chip (SOC) device. In some embodiments, processing unit 131 may be optimized for low-power operation with extensive clock gating. In this embodiment, various internal control circuits may be implemented for processing unit operation in various power states. For example, processing unit 131 may include a wake-up interrupt controller (WIC) configured to wake the processing unit up from a sleep state, allowing power to be switched off when the IC or SOC is in a sleep state. CPU subsystem 130 may include one or more memories, including a flash memory 133, and static random access memory (SRAM) 135, and a read-only memory (ROM) 137. Flash memory 133 may be a non-volatile memory (NAND flash, NOR flash, etc.) configured for storing data, programs and/or other firmware instructions. Flash memory 133 may include a read accelerator and may improve access times by integration within CPU subsystem 130. SRAM 135 may be a volatile memory configured for storing data and firmware instructions accessible by processing unit 131. ROM 137 may be configured to store boot-up routines, configuration parameters, and other firmware parameters and settings that do not change during operation of system 100. SRAM 135 and ROM 137 may have associated control circuits. Processing unit 131 and the memories may be coupled to a system interconnect 139 to route signals to and from the various components of CPU subsystem 130 to other blocks or modules of system 100. System interconnect 139 may be implemented as a system bus such as a single-level or multi-level AHB. System interconnect 139 may be configured as an interface to couple the various components of CPU subsystem 130 to each other. System interconnect 139 may be coupled to peripheral interconnect 111 to provide signal paths between the components of CPU subsystem 130 and peripheral subsystem 110.

System 100 may also include a number of system resources 140, including a power module 141, a clock module 143, a reset module 145, and a test module 147. Power module 141 may include a sleep control module, a wake-up interrupt control (WIC) module, a power-on-reset (POR) module, a number of voltage references (REF), and a PWRSYS module. In some embodiments, power module 141 may include circuits that allow system 100 to draw and/or provide power from/to external sources at different voltage and/or current levels and to support controller operation in different power states, such as active, low-power, or sleep. In various embodiments, more power states may be implemented as system 100 throttles back operation to achieve a desired power consumption or output. Clock module 143 may include a clock control module, a watchdog timer (WDT), an internal low-speed oscillator (ILO), and an internal main oscillator (IMO). Reset module 145 may include a reset control module and an external reset (XRES) module. Test module 147 may include a module to control and enter a test mode as well as testing control modules for analog and digital functions (digital test and analog DFT).

System 100 may be implemented in a monolithic (e.g., single) semiconductor die. In other embodiments, various portions or modules of system 100 may in implemented on different semiconductor dies. For example, memory modules of CPU subsystem 130 may be on-chip or separate. In still other embodiments, separate-die circuits may be packaged into a single "chip," or remain separate and disposed on a circuit board (or in a USB cable connector) as separate elements.

System 100 may be implemented in a number of application contexts to provide USB-PD functionality thereto. In each application context, an IC controller or SOC implementing system 100 may be disposed and configured in an electronic device (e.g., a USB-enabled device) to perform operations in accordance with the techniques described herein. In one example embodiment, a system 100 may be disposed and configured in a personal computer (PC) power adapter for a laptop, a notebook computer, etc. In another example embodiment, system 100 may be disposed and configured in a power adapter (e.g., a wall charger) for a mobile electronic device (e.g., a smartphone, a tablet, etc). In another example embodiment, system 100 may be disposed and configured in a wall socket that is configured to provide power over USB Type-A and/or Type-C port(s). In another example embodiment, system 100 may be disposed and configured in a car charger that is configured to provide power over USB Type-A and/or Type-C port(s). In yet another example embodiment, system 100 may be disposed and configured in a power bank that can get charged and then provide power to another electronic device over a USB Type-A or Type-C port. In other embodiments, a system like system 100 may be configured with the power switch gate control circuitry described herein and may be disposed in various other USB-enabled electronic or electro-mechanical devices.

It should be understood that a system, like system 100 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 100 should be regarded in an illustrative rather than a restrictive sense.

Figure 2:
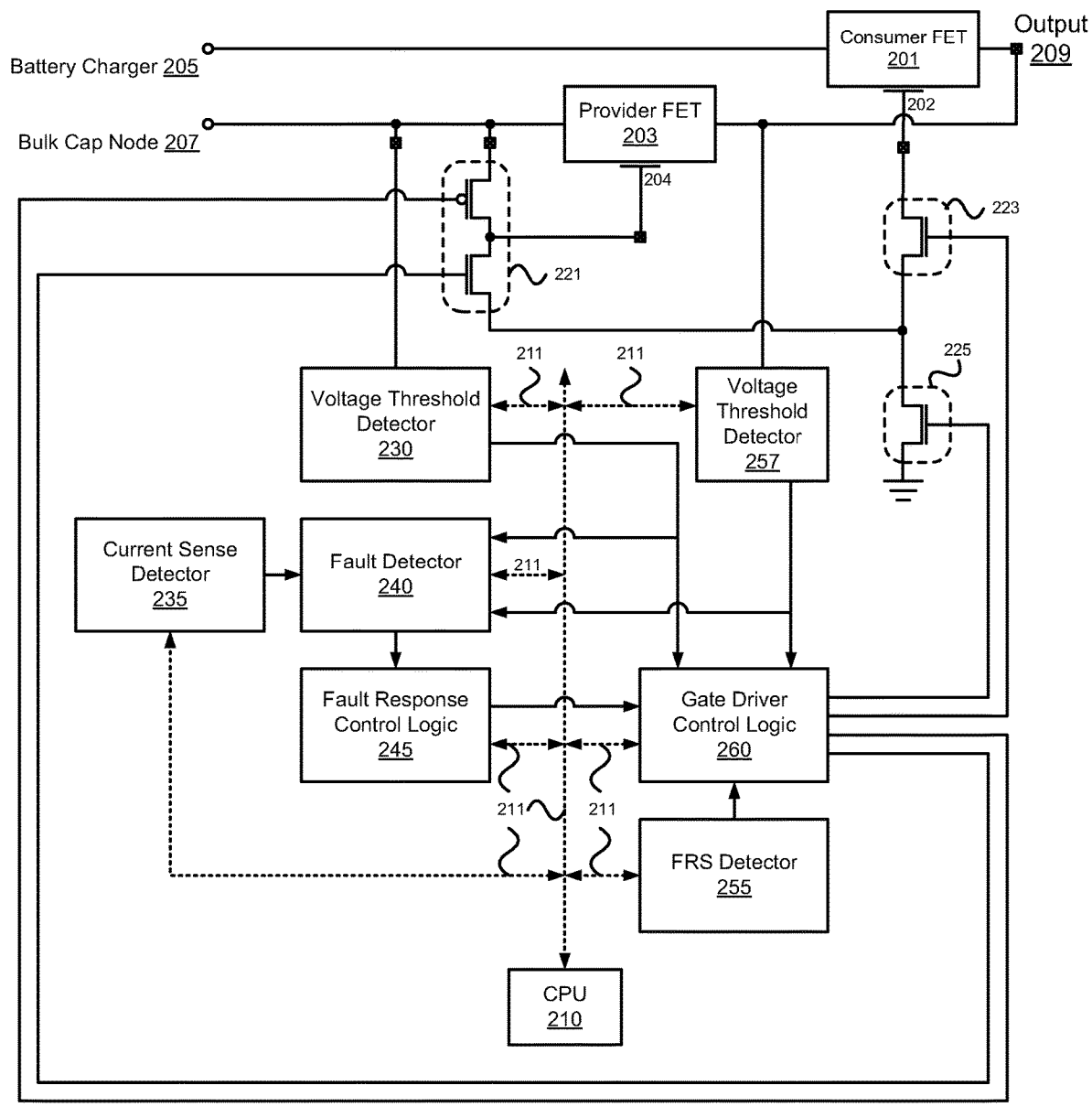
FIG. 2 illustrates a gate driver control system for use in USB power delivery including power switches configured as provider and consumer field effect transistors (FETs), according to some embodiments.

FIG. 2 illustrates an embodiment of a gate driver control system 200. Gate driver control system 200 may include a consumer FET 201 (also referred to as a power switch, herein) coupled to a battery charger circuit 205 and a provider FET 203 (also referred to as a power switch, herein) coupled to a bulk capacitor node 207. Consumer FET 201 and provider FET 203 may also be coupled to an output node 209. Consumer FET 201 and provider FET 203 may also have gates (or control terminals) 202 and 204, respectively. Consumer FET 201 and provider FET 203 may be referred to as power switches, in various embodiments. Nodes, such as bulk capacitor node 207 and output node 209 and nodes coupled to battery charger circuit 205 may also be referred to as terminals.

Gate driver control system 200 may also include gate drivers coupled to the gates 202 and 204 of consumer FET 201 and provider FET 203. Gate driver 221 may include an PFET coupled between the gate 204 of provider FET 203 and another gate driver 223, and a pull-down current control circuit 225. The control circuit, 225, may exist as a common resource for both gate drivers 221 and 223 or each gate driver can employ independent control circuits. The PFET of gate driver 221 may include a gate coupled to gate driver control logic 260 to receive control signals that define the state of the PFET. Gate driver 221 may also include a PFET active pullup circuit coupled between the NFET of gate driver 221 and bulk capacitor node 207, which is also coupled to either the source or the drain of provider FET 203. The PFET active pullup circuit may include a gate coupled to gate driver control logic 260 to receive control signals and be in-built.

The in-built active pullup circuit may be activated on detection of a fault condition by voltage threshold detector 230, fault detector 240 or voltage threshold detector 257. by signals from gate driver control logic 260. The active pullup circuit coupled to the gate driver control logic may provide fast turn-off of provider FET 203 in the case of fault detection. During normal operation (when no fault condition is detected) the gate driver may be disabled and the provider FET turned off through a passive pullup.

Gate driver 223 may have a drain coupled to the gate 202 of consumer FET 201 and a source coupled to gate driver 221 and a pulldown current control circuit 225. Gate driver 223 may also include a gate coupled to gate driver control logic 260 for receiving control signals. Gate driver control logic may also provide control signals to pulldown current control circuit 225, which is coupled to the source of gate driver 223 and gate driver 221.

Gate driver control system 200 may include a pair of voltage threshold detectors 230 and 257 coupled to the bulk capacitor node and the output node. Voltage threshold detectors may monitor the voltage on the bulk capacitor node and the output node and provide inputs for processing by gate driver control logic 260. In one embodiment, signals from voltage threshold detectors may be used to provide control signals to gate drivers 221 and 223 and to pulldown current control circuit 225.

Gate driver control system may also include a fault detector 240. Fault detector 240 may be coupled to outputs of voltage threshold detectors 230 and 257. It may also be coupled to a current sense detector 235. Fault detector 240 may detect fault conditions such as reverse current, over current, over voltage, and others and provide the results of the fault detection to a fault response control logic module 245. Fault response control logic module 245 may then provide signals to gate driver control logic 260 to control gate drivers 221 and 223 as well as pulldown current control circuit 225.

Gate driver control system 200 may also include a CPU for sending and receiving signals to the various detectors and control logic circuits through one or more buses. In one embodiment, CPU 210 may be configured to process inputs from the various threshold detectors, current sense detectors and fault detectors and provide instructions for date driver control logic, rather than gate driver control logic processing the inputs automatically (i.e., without CPU input).

If consumer FET 201 is a PFET, gate 202 is pulled down (LOW) to turn on the consumer FET. To turn off consumer FET 201, gate 202 of the PFET is pulled up (HIGH). The state of gate 202 is set by gate driver 223 and the pulldown current may be controller by pulldown current control circuit 225. Increasing the pulldown current progressively may reduce the inrush current to consumer FET 201.

The above description refers to consumer FET 201 and provider FET 203 as PFETs. However, in other embodiments one or both of consumer FET 201 and provider FET 203 may be NFETs. In this embodiment, it may be necessary to provide a charge pump on gates 202 and 204 to provide the necessary voltage to turn on consumer FET 201 and provider 203.

Various elements of gate driver control system 200 may have additional programmability. Programmability may be used to alter thresholds, slew rates, current sensing sensitivity, and for adding conditions and functionality after production (i.e., for field upgrades). For example, threshold voltage detector 230 and 257 may have thresholds that may be changed based on programmed values. Fault detector 240 may be programed to receive various inputs for detecting a fault and for treating those inputs differently based on its programming. Likewise, fault response control logic 245 may be programmed to provide different commands to gate driver control logic 260. And gate driver control logic 260 may provide signals to gate drivers 221 and 223 as well as pulldown current control logic based on programmed values.

Programmability may be achieved through any one of several methods. In a first embodiment, settings for the various programmable elements of gate driver control system 200 may be stored in a non-volatile memory, such as Flash memory 133. In this embodiment, configuration data may be stored in an array of storage elements (e.g. memory banks, locations, etc.). The programmability may be reprogrammable, such as with Flash memory 133 or SRAM 135, or it may be one time-programmable (OTP), such as with ROM 137. Programming values may be read from a first memory array and stored in a random access memory (RAM) or flops, from which the values may be accessed. In another embodiment, programming values maybe read directly from RAM. In various embodiments, memory elements for use with gate driver control system 200 may be on-chip. But in other embodiments, programming values may be stored on an external memory, such as an electrically erasable programmable read-only memory (EEPROM) and read by gate driver control system 200 from that external memory. In one embodiment, the values of the external memory may be read and used to configure gate driver control system 200 at a power-on reset (POR).

Programmability may also be realized with the use of laser fuses, E-fuses, or non-volatile latches. In these embodiments, the configuration of the fuses and latches may be used to set appropriate values to 1 or 0 to provide configuration information to gate driver control system 200.

In another embodiment, inputs of a circuit comprising gate driver control system 200 may be used to provide settings to the various programmable elements. In this embodiment, inputs (or pins) may be coupled to a power supply (VDD; '1'; HIGH) or a ground (VSS; '0'; LOW) to provide binary values to the device. These pins may be coupled by soldering (or otherwise coupling) an IC with the gate driver control system to traces coupled to these voltages. In another embodiment, pins of a jumper may be coupled to the IC and may be coupled to each other with a connecting element. In still another embodiment, solder pads corresponding to circuit elements that may be placed on the board to make the necessary connections may be used. In this embodiment 0-ohm resistors (or wires) may provide galvanic coupling between pins of the IC and the appropriate voltage potential.

In another embodiment, resistor configurations may be used to provide programmability. In this embodiment, one or more resistors may be coupled between a pin (or pins) and power or ground to create a voltage or current on that pin or those pins. The voltage or current may be measured (or converted to a digital value) by an ADC to provide a value corresponding to a setting for one or more parameters of gate driver control system 200.

Figure 3:
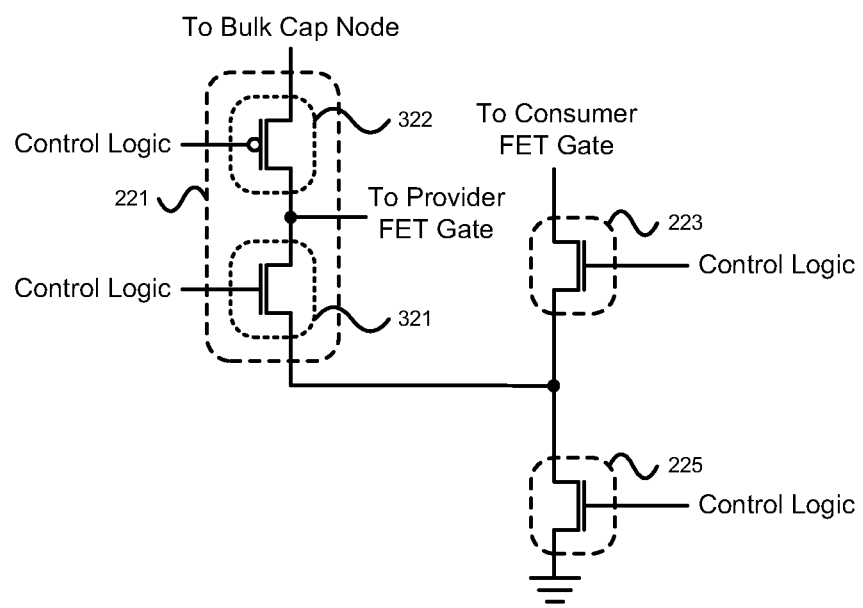
FIG. 3 illustrates gate driver control circuits for use in USB power delivery, according to some embodiments.

FIG. 3 illustrates an array 300 of gate driver control circuits for use in USB power delivery. Array 300 may include a gate control circuit 221 coupled to the gate of a power switch (Provider FET). Control circuit 221 may comprises of a pair of switches 321 and 322. Switch 321 may be an NFET with its drain coupled to the gate of the power switch and its source coupled to a node shared between gate control circuit 223 and pulldown current control circuit 225. The gate of switch 321 may be coupled to control logic, which may provide control signals to the gate to turn on or off the switch. In various embodiments the gate of switch 321 may be controlled with a linear or discrete control signal to modulate the control provided by the gate control circuit to the power switch (Provider FET).

Switch 322 of control circuit 321 may be a PFET with its source coupled to the bulk cap node (of FIG. 2) and it's drain coupled to the gate of a power switch (Provider FET). Switch 322 may operate as an active pullup circuit to turn off the gate of the power switch (Provider FET) when the control signal is provided to switch 322.

Control circuit 223 may be a switch or NFET with its source coupled to a second power switch (Consumer FET) and it's drain coupled to a node (or terminal) shared between gate control circuit 221 and pulldown current control circuit 225. The gate of the switch of control circuit 223 may be coupled to control logic, which may provide control signals to the gate to turn on or off the switch. In various embodiments the gate of switch 321 may be controlled with a linear or discrete control signal to modulate the control provided by the gate control circuit to the second power switch (Consumer FET).

Pulldown current control circuit 225 may provide control of pulldown current to both gate control circuit 221 and gate control circuit 223. Pulldown control may be achieved with linear or discrete control of the gate of a switch of pulldown current control circuit. Pulldown control circuit 225 may receive control signals from control logic that provide a current level on the gate of the switch or may provide a pulse-width-modulated signal to the gate to turn on and off the gate to achieve the desired pulldown current.

The various control signals provided to the circuit elements of array 300 may be provided by instructions from a CPU, they may be received from an external device, or they may be provided by a logic pathway when certain system conditions are detected.

Figure 4:
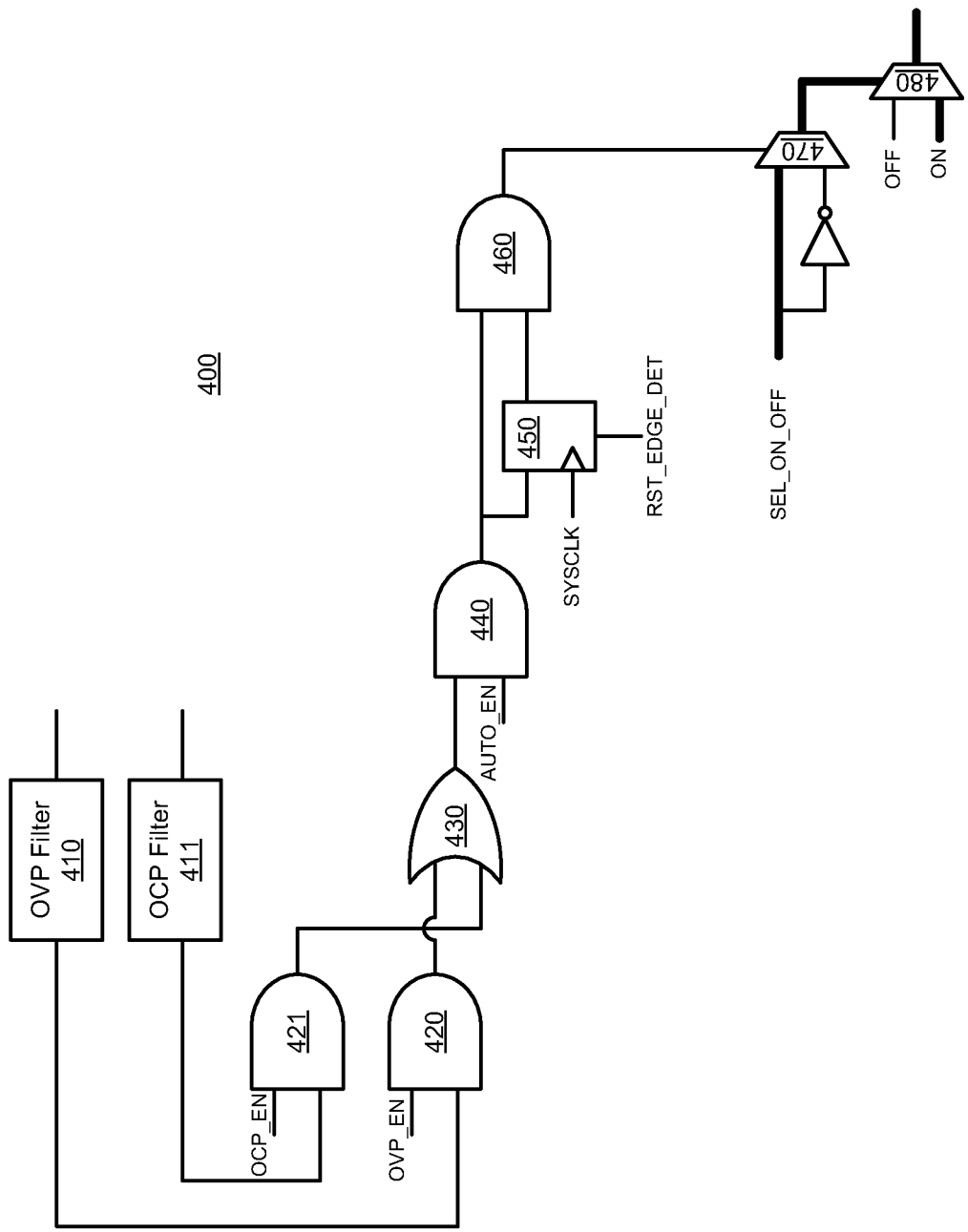
FIG. 4 illustrates a logic path for recognition and processing of a fault condition in USB power delivery, according to some embodiments.

FIG. 4 is a logic flow 400 for fault signals received by the gate driver control logic 260 (of FIG. 2) and the response provided to the gate drivers (221 and 223 of FIG. 2). If an over-voltage condition is detected, the signal is input to an over-voltage protection filter 410 to provide some hysteretic control of the over-voltage detection and to ensure that the detection is not a duplicate. That is, when an over-voltage condition is detected, it does not need to be detected again, so an edge detector is used to detect the change in over-voltage condition state. If over-voltage protection is enabled, the output of AND logic element 420 is set high. If an over-current condition is detected, the signal is input to an over-current protection filter 411 to provide some hysteretic control of the over-current detection and to ensure that the detection is not a duplicate. That is, when an over-current condition is detected, it does not need to be detected again, so an edge detector is used to detect the change in over-current condition state. If over-current protection is enabled, the output of AND logic element 421 is set high. The outputs of AND logic elements 420 and 421 are input to OR logic element 430 so that if either an over-voltage condition or an over-current condition is detected, the output of OR logic element 430 is set high. If an automatic response mode is enabled (AUTO_EN), the output from OR logic element 430, an over-voltage or over-current condition is detected, the output of AND logic element 440 is set to high. A delay circuit 450 is routed between the output of AND logic element 440 and an input of AND logic element 460. The output of AND logic element 440 is coupled to another input of logic element 460. The output of AND logic element 460 may provide control signals to a multiplexer (MUX) 470 with inputs coupled to an on/off signal and its complement (i.e., from an inverter). The output of MUX 470 may provide control signals to another MUX 480 coupled to driver control signals (ON/OFF), such that control signals are sent to the gate driver in response to over-current and over-voltage conditions.

If no over-voltage condition or over-current condition is detected, or if the edge detect signal has not been reset, or if an automatic response mode is not enabled, the ON signal input to MUX 470 may be selected and the ON driver signal may be selected for MUX 480. In this embodiment, the gate of the power switch (e.g. provider FET or consumer FET) may be turned on.

Figure 5:
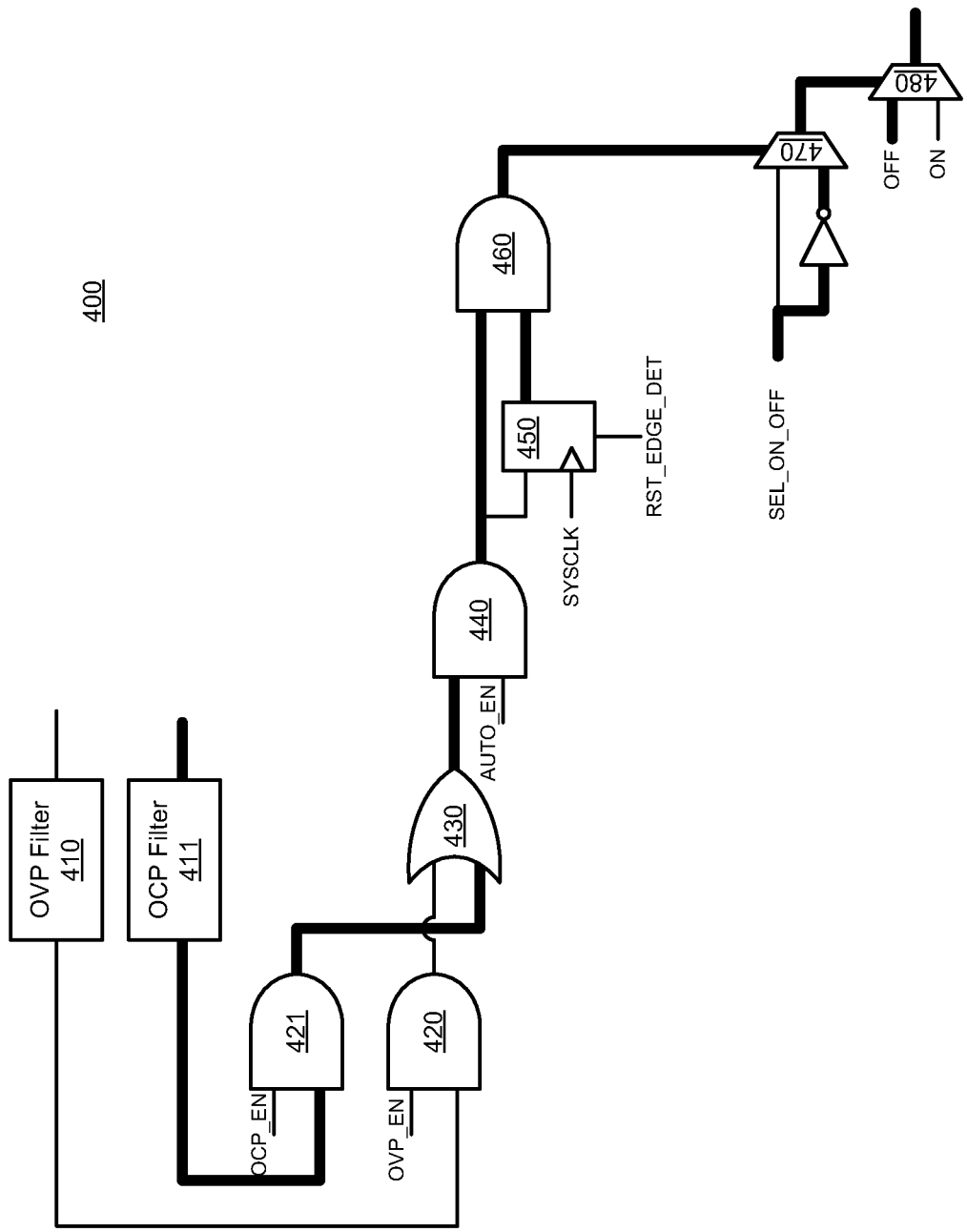
FIG. 5 illustrates the logic path of FIG. 4 with a recognized fault, according to an example embodiment.

FIG. 5 illustrates the logic flow 400 of FIG. 4, but with an over-current condition detected and the edge detector having detected a change in state. In this example, the OFF control signal is provided to at least one of the gate drivers and gate of the corresponding power switch is turned off. FIG. 5 illustrates an embodiment for an over-current condition, but an over-voltage condition may be evaluated with the same logic flow to provide the necessary gate driver control signals.

Figure 6:
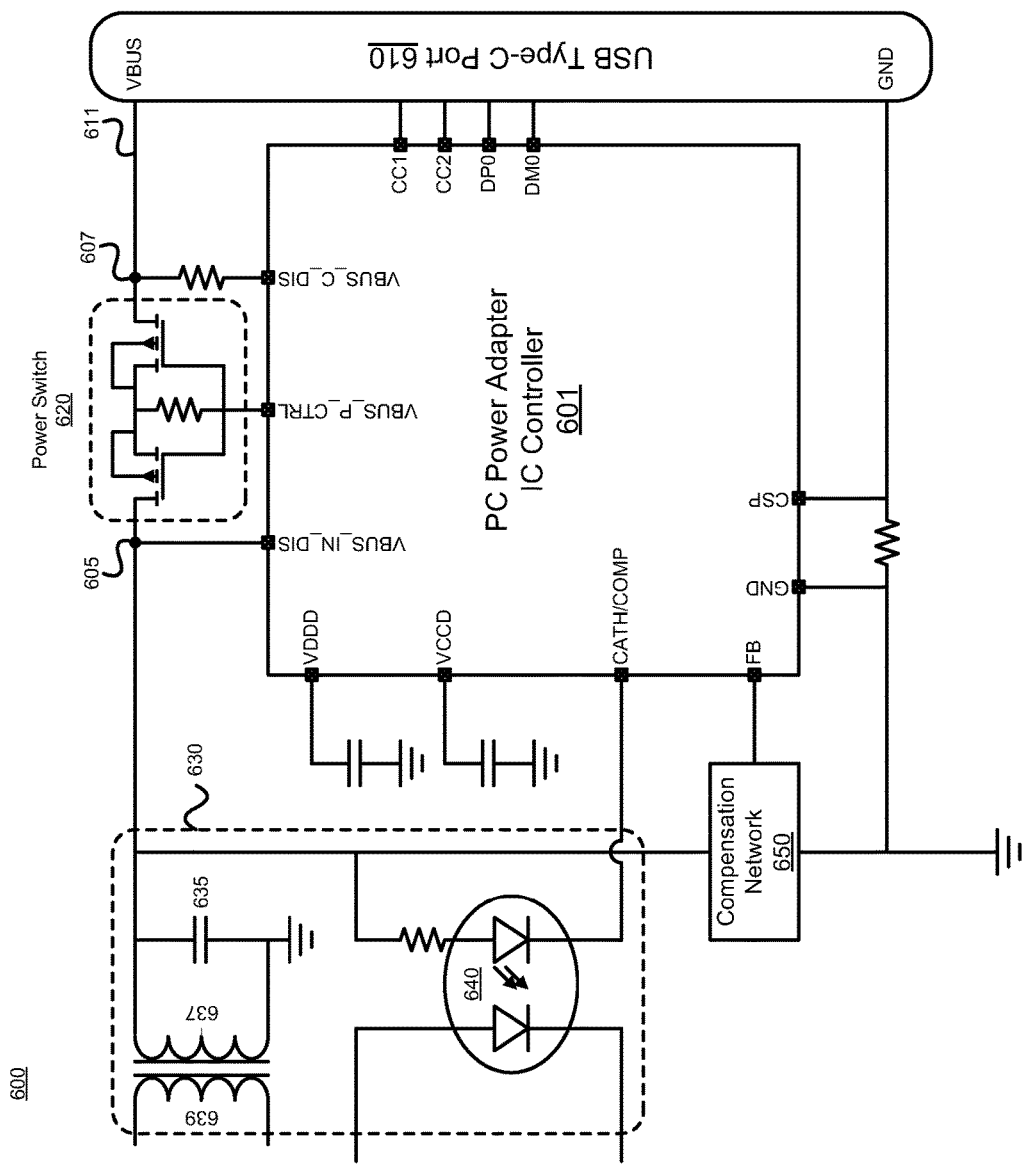
FIG. 6 illustrates a schematic diagram of a personal computer (PC) USB-PD power adapter, according to an example embodiment.

FIG. 6 illustrates a PC power adapter 600 with opto-isolator feedback, according to an example embodiment. IC controller 601 may be disposed in a chip package and includes a USB-PD subsystem configured in accordance with the techniques for gate driver control described herein. IC controller 601 is configured to negotiate a PD contract with a consumer device (not shown) attached to USB Type-C port 610 and to control through an output pin ("CATH/COMP") the required VBUS voltage that is output from power converter 630. USB Type-C port 640 is typically associated with a Type-C plug, but it should be understood that in various embodiments the USB Type-C port may be associated with a Type-C receptacle instead. Power converter 630 is an AC power source and is coupled to compensation network 650, which may be resistor-capacitor (RC) circuit specific to the design of the power converter and is coupled to receive a feedback signal from an output pin ("FB") of IC controller 601. Power converter 630 may include an inductor 637 and a large bulk capacitor 635 coupled between an input of power switch 620 and ground. Power converter 630 may also include a feedback control module 640 for communicating across an isolation barrier.

IC controller 601 is coupled to VBUS line 611 and is configured to control the operation and state of power switches (such as power switch 620) when fault conditions are detected by providing control signals to the gate of the power switches. VBUS line 601 includes power switch 620 configured as an on/off switch device controlled by signals from an output pin ("VBUS_P_CTRL") of a gate driver in IC controller 600 similar to the gate driver control circuit 200 shown in FIG. 2. Power switch 620 may correspond to provider FET 203 of FIG. 2. On one side of power switch 603, a power source node 605 on the VBUS line is coupled to power converter 630, which includes the large bulk capacitor 635 configured to remove the AC component of the power signal. Power source node 605 is coupled to an input pin ("VBUS_IN_DIS") of IC controller 601. The "VBUS_IN_DIS" pin is coupled to an on-die discharge circuit that is configured to pull down current from power source node 605, thereby reducing its VBUS voltage. The on-die discharge circuit may correspond to active pulldown circuit 225 of FIG. 2. On the other side of power switch 620, an output node 607 on the VBUS line is coupled to USB Type-C port 610. Output node 607 is coupled to another input pin ("VBUS_C_DIS") of IC controller 601. The "VBUS_C_DIS" pin is coupled to another on-die discharge circuit that is configured to pull down current from output node 607, thereby reducing its VBUS voltage. The on-die discharge circuit configured to pull down current from output node may be pulldown control circuit 225 of FIG. 2. The current pulled down through the on-die discharge circuits of IC controller 600 is driven to output pin ("GND") of IC controller 601. The GND pin is coupled to the ground GND line of USB Type-C port 610. Discharge control logic in IC controller 600 is configured to control the operation of each discharge circuit separately and independently of the other by use of enable and control signals that regulate the timing, duration, and amount of the current conducted by each discharge circuit through the IC controller.

In operation, the direction of power flow on VBUS line 611 is from power converter 630 to a consumer device, such as a laptop computer (not shown), that is attached to USB Type-C port 610. When a PD contract with the consumer device is negotiated, IC controller 601 turns on power switch 620 to provide power to the consumer device at the negotiated voltage and/or current level(s). A negative voltage transition on VBUS line 611 may be needed when the PD contract is dynamically re-negotiated to lower the VBUS voltage and/or current, e.g., when the consumer device has finished charging its battery and now needs power only to operate. In response, discharge control logic in IC controller 601 turns on the on-die discharge circuit(s) to reduce the VBUS voltage at nodes 605 and/or 607, in accordance with the techniques described herein. The discharge control logic turns off the discharge circuits and stops discharging when the voltage on VBUS line 611 reaches the lower voltage level required by the new PD contract.

On detection of fault conditions, a control signals may be sent to power switch 620 to turn off the switch, thereby disconnecting the USB Type-C port 610 from the power converter 630. The power switch 620 is turned off by driving the output of VBS_P_CTRL below VDD. This disconnection may be caused by an over-voltage condition, an over-current condition, or other conditions that may require disconnection of the USB Type-C port 610 from power converter 630 for protection of circuits coupled to the USB Type C port 610. Similarly, the on-chip discharge circuits may be implemented to adjust the slew rate in response to power consumption or other parameters.

Figure 7:
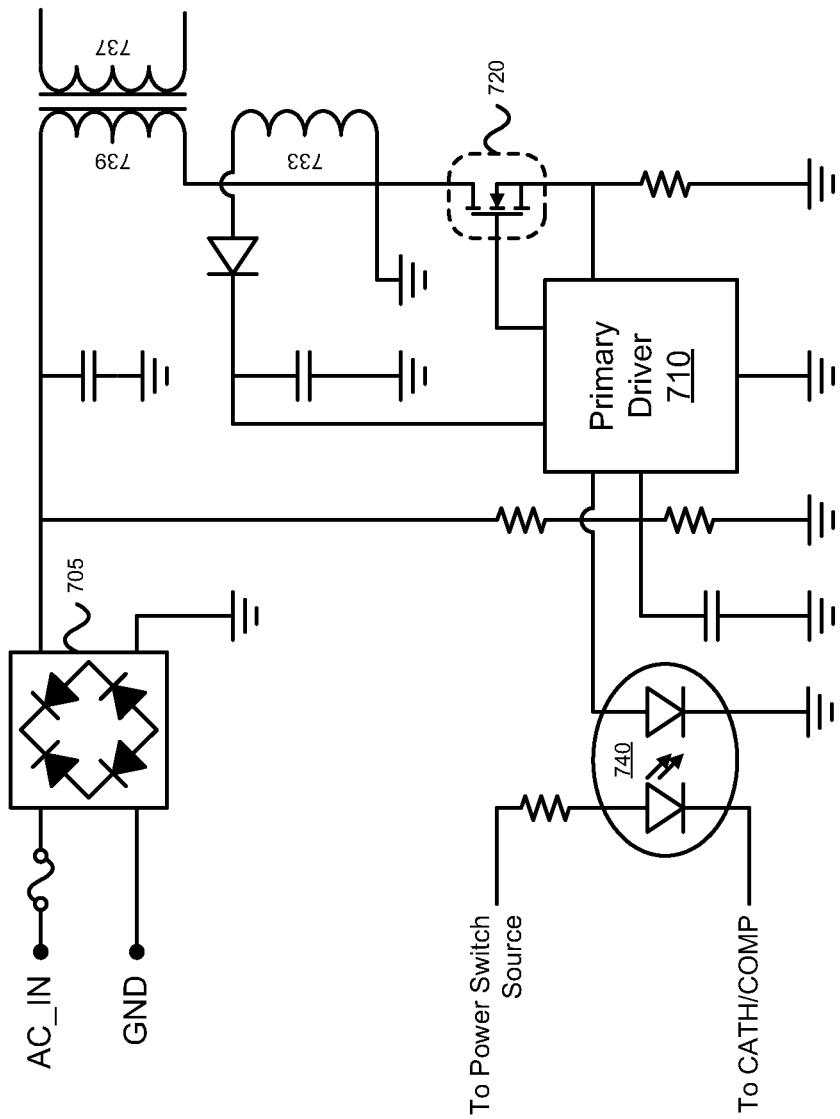
FIG. 7 illustrates a schematic diagram of a charging power source for use in USB power delivery, according to an example embodiment.

FIG. 7 illustrates one embodiment of a primary side circuit 700 in an opto-isolated power supply. An alternating current (AC) signal (AC_IN) may be provided to a bridge rectifier circuit 705, which provides a full-wave rectified signal to inductor 739 (which corresponds to inductor 639 of FIG. 6). The signal is then received in inductor 737 (which corresponds to inductor 637 of FIG. 6) to provide the charging signal to the USB power delivery circuit (not shown). Primary side circuit 700 may also include inductor 733 for detecting the phase of switching of primary driver 710 to provide control signals to the USB power driver circuit through isolation circuit 740 (which corresponds to isolation circuit 640 of FIG. 6). Primary driver 710 may also provide control signals to switching element 720 to control inductor 739. Primary side circuit 700 may also be used in a power adapter application, described in FIG. 8 below.

Figure 8:
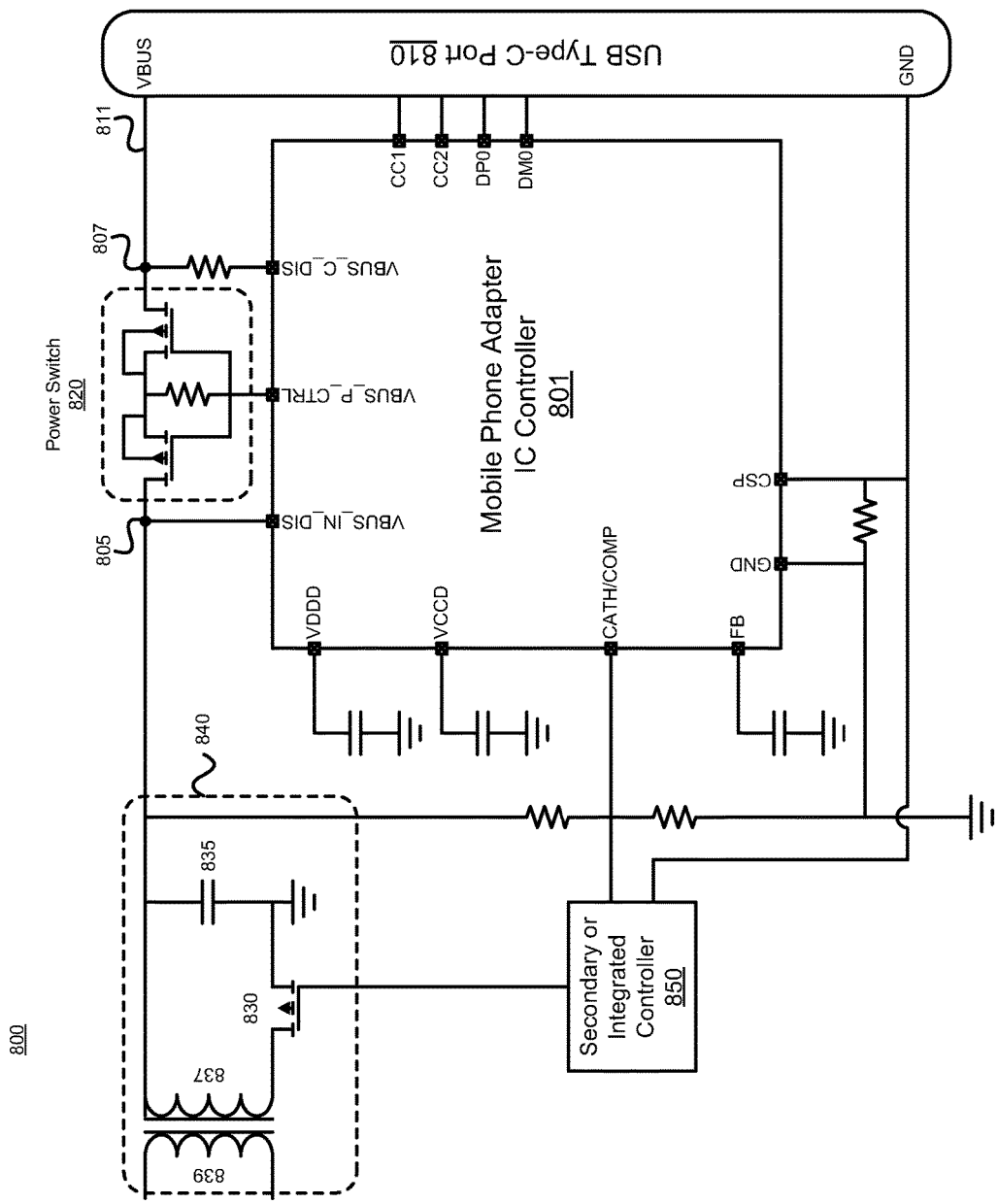
FIG. 8 illustrates a schematic diagram of a mobile phone USB-PD power adapter, according to an example embodiment.

FIG. 8 illustrates a USB-PD power adapter 800 according to various embodiments (e.g., such as a wall adapter for a mobile phone, or a wall socket). IC controller 801 may be disposed in a chip package and includes a USB-PD subsystem configured in accordance with the techniques for fault detection and power switch control described herein. IC controller 801 is configured to negotiate a PD contract with a consumer device (not shown) attached to USB Type-C port 810. In various embodiments, USB Type-C port 810 can be associated with a Type-C plug or a Type-C receptacle. Power converter 840 is an AC power source and includes a large bulk capacitor 835 configured to remove the AC component of the power signal provided onto VBUS line 801. Power converter 840 may include a switch 830 for control of the power converter by secondary or integrated controller 850. Power converter 840 is coupled to secondary or integrated controller 850, which is configured to control the voltage provided by power converter 840 based on a feedback signal from an output pin ("FB") of IC controller 801. IC controller 801 may support two modes of operation, constant voltage mode and constant current mode (also referred to as direct charging mode). Upon appropriate negotiation with a consumer device over USB Type-C port 810, IC controller 801 switches between its two modes of operation and provides the appropriate feedback signal on its output pin "FB" to control the operation of secondary or integrated controller 850.

IC controller 801 is coupled to VBUS line 811 and is configure to control the operation and state of power switches (such as power switch 820) when fault conditions are detected by providing control signals to the gate of the power switches. VBUS line 811 includes power switch 820 that is configured as an on/off switch device controlled by signals from an output pin ("VBUS_P_CTRL") of a gate driver in IC controller 801, which receives signals or instructions from on-chip logic or a CPU (as discussed in FIG. 2). On one side of power switch 820, a power source node 805 on the VBUS line is coupled to power converter 840. Power source node 805 is coupled to an input pin ("VBUS_IN_DIS") of IC controller 801. The "VBUS_IN_DIS" pin is coupled to an on-die discharge circuit that is configured to pull down current from power source node 805, thereby reducing its VBUS voltage. On the other side of power switch 820, an output node 807 on the VBUS line is coupled to USB Type-C port 810. Output node 807 is coupled to another input pin ("VBUS_C_DIS") of IC controller 801. The "VBUS_C_DIS" pin is coupled to another on-die discharge circuit that is configured to pull down current from output node 807, thereby reducing its VBUS voltage. The current pulled down through the on-die discharge circuits of IC controller 801 is driven to output pin ("GND") of IC controller 801. GND is coupled the ground GND line of USB Type-C port 810. Discharge control logic in IC controller 801 is configured to control the operation of each discharge circuit separately and independently of the other by use of enable and control signals that regulate the timing, duration, and amount of the current conducted by each discharge circuit through the IC controller.

In operation, the direction of power flow on VBUS line 811 is from power converter 840 to a consumer device, such as a mobile phone (not shown), that is attached to USB Type-C port 810. When a PD contract with the consumer device is negotiated, IC controller 801 turns on power switch 820 to provide power to the consumer device at the negotiated voltage and/or current level(s). A negative voltage transition on VBUS line 811 may be needed when the PD contract is dynamically re-negotiated to lower the VBUS voltage and/or current, e.g., when the consumer device has finished charging its battery. In response, discharge control logic in IC controller 801 turns on the on-die discharge circuit(s) to reduce the VBUS voltage at nodes 805 and/or 807. The discharge control logic turns off the discharge circuits and stops discharging when the voltage on VBUS line 811 reaches the lower voltage level required by the new PD contract.

On detection of fault conditions, control signal may be sent to power switch 820 to turn off the switch, thereby disconnecting the USB Type-C port 810 from the power converter 830. This disconnection may be caused by an over-voltage condition, an over-current condition, or other conditions that may require disconnection of the USB Type-C port 810 from power converter 830 for protection of circuits coupled to the USB Type C port 810. Similarly, the on-chip discharge circuits may be implemented to adjust the slew rate in response to power consumption or other parameters.

Figure 9:
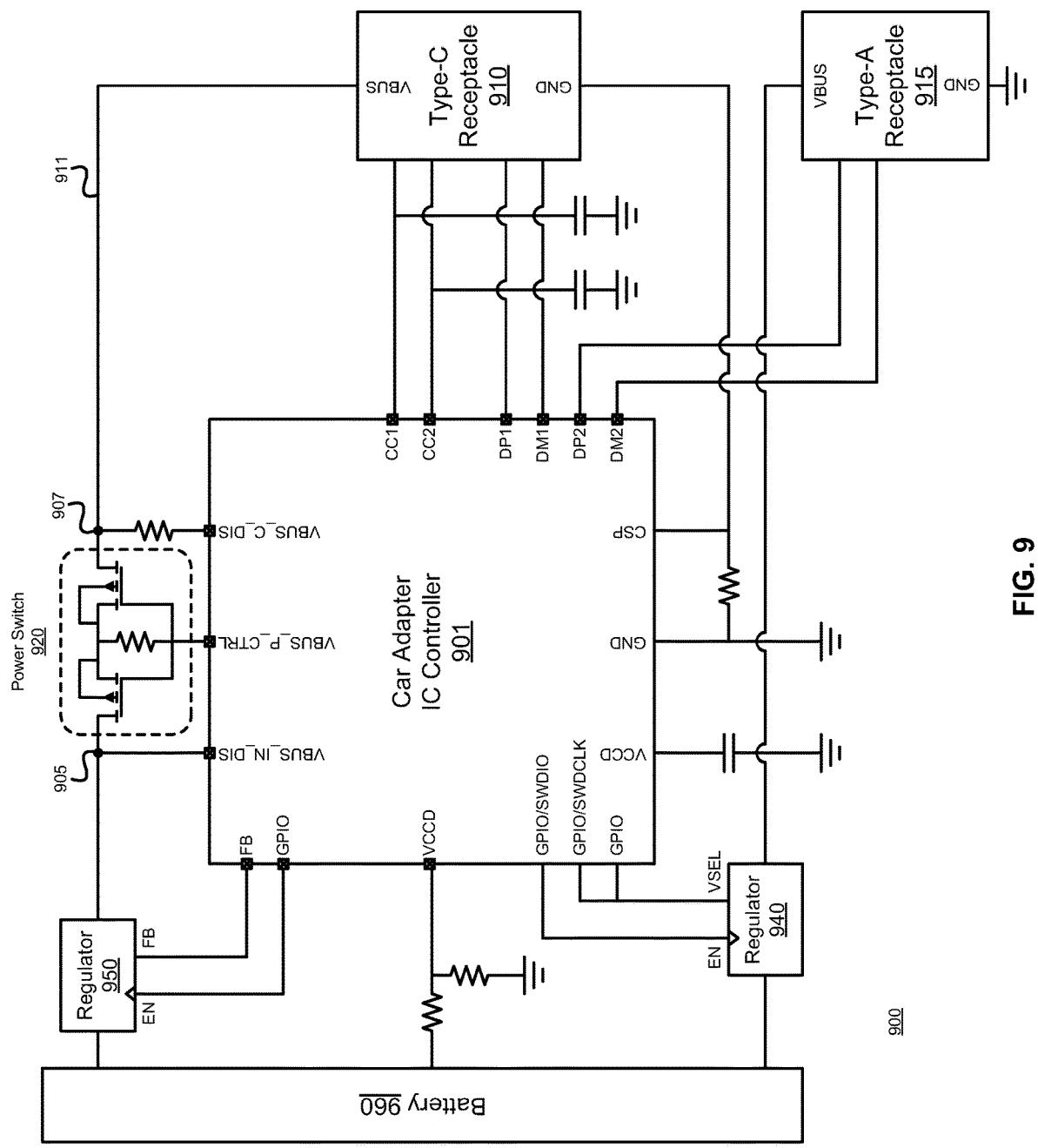
FIG. 9 illustrates a schematic diagram of a USB-PD car charger, according to an example embodiment.

FIG. 9 illustrates an example two-port USB Type-A/Type-C car charger 900, according to an example embodiment. IC controller 901 may be disposed in a chip package and includes a USB-PD subsystem configured in accordance with the techniques to control the operation and state of power switches (such as power switch 920) when fault conditions are detected by providing control signals to the gate of the power switches. IC controller 901 is configured to negotiate a PD contract with a consumer device (not shown) attached to USB Type-C port 910. USB Type-C port 910 is typically associated with a Type-C receptacle, but it should be understood that in various embodiments the USB Type-C port may be associated with a Type-C plug instead. Battery 960 is a DC power source, e.g., such as a car battery. Battery 960 is coupled to regulator 950, which is configured to control the voltage provided by the battery on VBUS line 911 based on enable and feedback signals from output pins of IC controller 901. Battery 960 is also coupled to regulator 940, which is configured to control the voltage provided by the battery on a VBUS line to USB Type-A port 915. Regulator 940 is controlled based on enable and voltage-select signals from output pins of IC controller 901, to provide VBUS voltages and currents in accordance with older USB specifications (e.g., such as the USB 2.0 Specification, the USB Battery Charging Specification Rev. 1.1/1.2, etc.) to charge USB-enabled devices through the USB Type-A port. In some embodiments, IC controller 901 may be configured with a charge-detect block for USB Type-A port 940 and may provide an option to enable or disable the USB Type-A charging.

IC controller 901 is coupled to VBUS line 911 and is configured to control the operation and state of power switches (such as power switch 920) when fault conditions are detected by providing control signals to the gate of the power switches. VBUS line 911 includes power switch 903 that is configured as an on/off switch device controlled by signals from an output pin ("VBUS_P_CTRL") of a gate driver in IC controller 901, which receives signals or instructions from on-chip logic or a CPU (as discussed in FIG. 2). On one side of power switch 920, a power source node 905 on the VBUS line is coupled to battery 960. Power source node 905 is coupled to an input pin ("VBUS_C_DIS") of IC controller 901. The "VBUS_C_DIS" pin is coupled to an on-die discharge circuit that is configured to pull down current from power source node 905, thereby reducing its VBUS voltage. On the other side of power switch 920, an output node 907 on the VBUS line is coupled to USB Type-C port 910. Output node 907 is coupled to another input pin ("VBUS_IN_DIS") of IC controller 901. The "VBUS_IN_DIS" pin is coupled to another on-die discharge circuit that is configured to pull down current from output node 907, thereby reducing its VBUS voltage. The current pulled down through the on-die discharge circuits of IC controller 901 is driven to GND pin of IC controller 901. The GND pin is coupled to the ground GND line of USB Type-C port 915. Discharge control logic in IC controller 901 is configured to control the operation of each discharge circuit separately and independently of the other by use of enable and control signals that regulate the timing, duration, and amount of the current conducted by each discharge circuit through the IC controller.

In operation, the direction of power flow on VBUS line 911 is from battery 960 to a consumer device, such as a mobile phone (not shown), that is attached to USB Type-C port 910. When a PD contract with the consumer device is negotiated, IC controller 901 turns on power switch 903 to provide power to the consumer device at the negotiated voltage and/or current level(s). A negative voltage transition on VBUS line 911 may be needed when the PD contract is dynamically re-negotiated to lower the VBUS voltage and/or current, e.g., when the consumer device has finished charging its battery. In response, discharge control logic in IC controller 901 turns on the on-die discharge circuit(s) to reduce the VBUS voltage at nodes 905 and/or 907, in accordance with the techniques described herein. The discharge control logic turns off the discharge circuits and stops discharging when the voltage on VBUS line 911 reaches the lower voltage level required by the new PD contract.

On detection of fault conditions, a control signals may be sent to power switch 920 to turn off the switch, thereby disconnecting the USB Type-C port 910 from the regulator. This disconnection may be caused by an over-voltage condition, an over-current condition, or other conditions that may require disconnection of the USB Type-C port 910 from regulator 950 for protection of circuits coupled to the USB Type C port 910. Similarly, the on-chip discharge circuits may be implemented to adjust the slew rate in response to power consumption or other parameters. In other embodiments, control signals may be sent from IC controller to regulator 950 to disable regulator 950, thereby stopping the charging.

Figure 10:
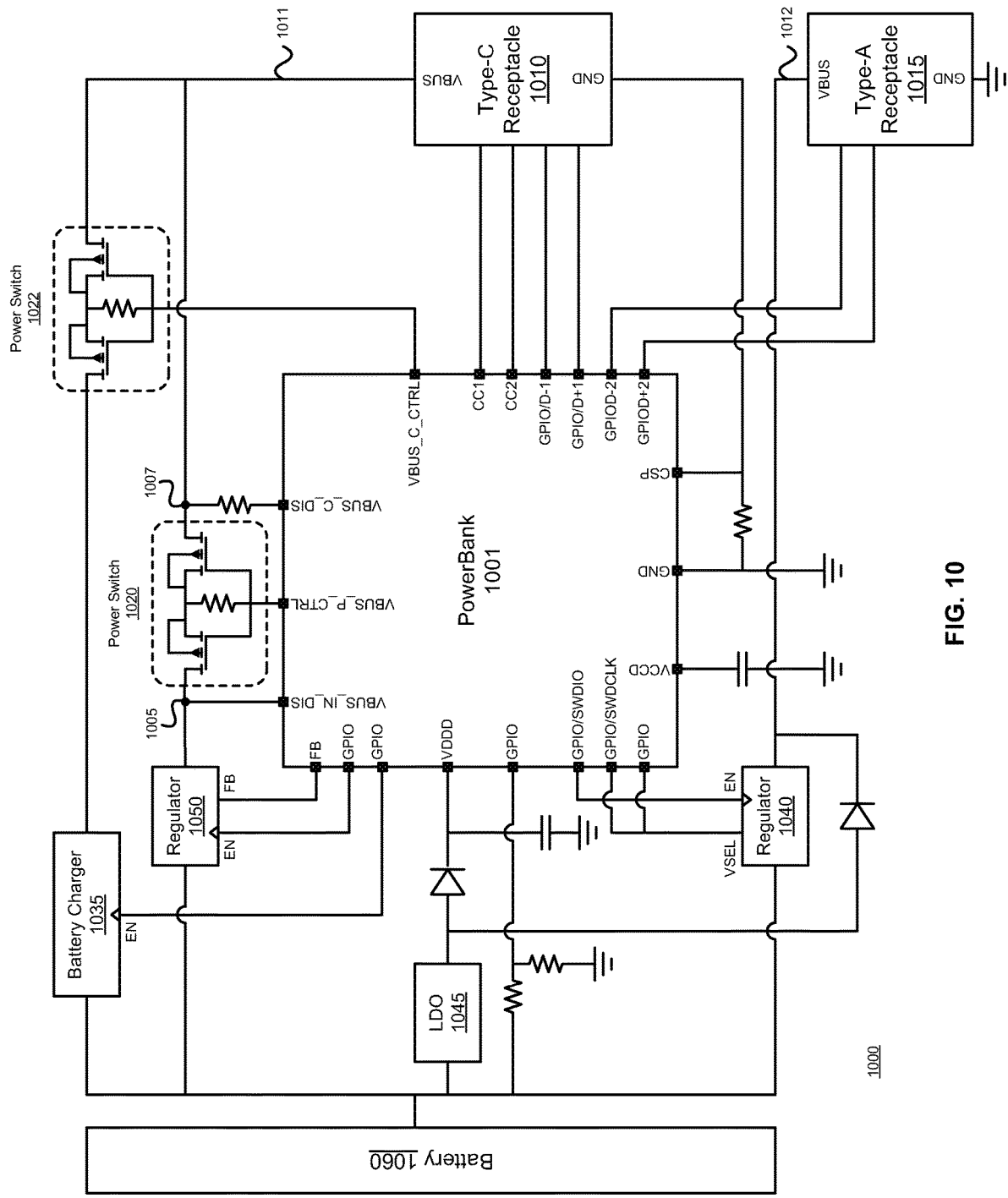
FIG. 10 illustrates a schematic diagram of a USB-PD power bank, according to an example embodiment.

FIG. 10 illustrates an example USB-PD power bank application 1000, according to one embodiment. The system illustrated in FIG. 10 may be a two-port USB Type-A/Type-C power bank configured to operate as either a power source or a power sink or can alternate between these two roles dynamically by using USB-PD power role swap. IC controller 1001 may be disposed in a chip package and includes a USB-PD subsystem configured in accordance with the techniques for to control the operation and state of power switches (such as power switches 1020 and 1022) when fault conditions are detected by providing control signals to the gate of the power switches. When operating in power source role, IC controller 1001 is configured to negotiate a PD contract with a consumer device (not shown) attached to USB Type-C port 1040. When operating in power sink role, IC controller 1001 is configured to control the charging of battery 1060 through USB Type-C port 1010. USB Type-C port 1010 is typically associated with a Type-C receptacle, but it should be understood that in various embodiments the USB Type-C port may be associated with a Type-C plug instead.

Battery 1060 is a DC power source that can be a single battery or a battery pack with multiple batteries coupled in series. Battery 1060 is coupled to regulator 1050. When IC controller 1001 is operating in power source role, regulator 1050 is configured to control the voltage provided on VBUS line 1011 based on enable and feedback signals from output pins of IC controller 1001. Battery 1060 is also coupled to regulator 1040. When IC controller 1001 is operating in power source role, regulator 1040 is configured to control the voltage provided by the battery on a VBUS line 1012 to USB Type-A port 1015. Regulator 1040 is controlled based on enable and voltage-select (VSEL) signals from output pins of IC controller 1001, to provide VBUS voltages and currents in accordance with older USB specifications (e.g., such as the USB 2.0 Specification, the USB Battery Charging Specification Rev. 1.1/1.2, etc.) to charge USB-enabled devices through the USB Type-A port. Battery 1060 is also coupled to battery charger 1035. When IC controller 1001 is operating in power sink role, battery charger 1035 is configured to control the voltage that is provided on VBUS line 1011 to charge battery 1060 based on an enable signal (EN) from an output pin of IC controller 1001. In embodiments in which the battery is a multi-battery pack (e.g., such as a laptop battery pack), a low drop out (LDO) regulator 1045 may be coupled between battery 1060 and an input pin ("VDDD") of IC controller 1001 to provide operating power to IC controller 1001.

IC controller 1001 is coupled to VBUS line 1011 and is configured to control the operation and state of power switches (such as power switches 1020 and 1022) when fault conditions are detected by providing control signals to the gate of the power switches. VBUS line 1011 includes power switch 1020 that is configured as an on/off switch device controlled by signals from an output pin ("VBUS_P_CTRL") of a gate driver in IC controller 1001, which receives signals or instructions from on-chip logic or a CPU (as discussed in FIG. 2). On one side of power switch 1020, a power source node 1005 on VBUS line 1011 is coupled to regulator 1050, which in turn is coupled to battery 1060. Power source node 1005 is coupled to an input pin ("VBUS_C_DIS") of IC controller 1001. The "VBUS_C_DIS" pin is coupled to an on-die discharge circuit that is configured to pull down current from power source node 1005, thereby reducing its VBUS voltage. On the other side of power switch 1020, an output node 1007 on the VBUS line is coupled to USB Type-C port 1010. Output node 1007 is coupled to another input pin ("VBUS_IN_DIS") of IC controller 1001. The "VBUS_IN_DIS" pin is coupled to another on-die discharge circuit that is configured to pull down current from output node 1007, thereby reducing its VBUS voltage. The current pulled down through the on-die discharge circuits of IC controller 1001 is driven to a GND pin of IC controller 1001. The GND pin is coupled to the ground (GND) line of USB Type-C port 1010. Discharge control logic in IC controller 1001 is configured to control the operation of each discharge circuit separately and independently of the other by use of enable and control signals that regulate the timing, duration, and amount of the current conducted by each discharge circuit through the IC controller.

When IC controller 1001 operates in power source role, the direction of power flow on VBUS line 1011 is from battery 1060 to a consumer device, such as a mobile phone (not shown), that is attached to USB Type-C port 1010. When a PD contract with the consumer device is negotiated, IC controller 1000 turns on power switch 1020 and turns off power switch 1022, and power is provided to the consumer device at the negotiated voltage and/or current level(s). A negative voltage transition on VBUS line 1011 may be needed when the PD contract is dynamically re-negotiated to lower the VBUS voltage and/or current, e.g., when the consumer device has finished charging its battery. In response, discharge control logic in IC controller 1001 turns on the on-die discharge circuit(s) to reduce the VBUS voltage at nodes 1005 and/or 1007, in accordance with the techniques described herein. The discharge control logic turns off the discharge circuits and stops discharging when the voltage on VBUS line 1011 reaches the lower voltage level required by the new PD contract.

IC controller 1001 is also coupled to power switch 1022 to control the charging of battery 1060 through USB Type-C port 1010, when operating in power sink role. Power switch 1022 is coupled on VBUS line 1011 between USB Type-C port 1010 and battery charger 1035 and is configured as an on/off switch device controlled by signals from an output pin ("VBUS_C_CTRL") of a gate driver in IC controller 1001.

On detection of fault conditions, a control signals may be sent to power switch 1020 and 1022 to turn off the switches, thereby disconnecting the USB Type-C port 1010 from the battery 1060 through regulator 1050. This disconnection may be caused by an over-voltage condition, an over-current condition, or other conditions that may require disconnection of the USB Type-C port 1010 from battery 1060 for protection of circuits coupled to the USB Type C port 1010. Similarly, the on-chip discharge circuits may be implemented to adjust the slew rate in response to power consumption or other parameters.

When IC controller 1001 operates in power sink role, the direction of power flow on VBUS line 1011 is from a power adapter (e.g., a wall charger) attached to USB Type-C port 1010 to battery 1060. IC controller 1001 turns on power switch 1022, turns off power switch 1020, and enables battery charger 1035 to charge battery 1060. Power then flows on VBUS line 1011 from USB Type-C port 1010 to battery 1060 at the voltage and current set by battery charger 1035. In this manner IC controller 1001 can alternate its operating role to implement a USB-PD DRP application, in various embodiments.

On detection of fault conditions, a control signals may be sent to power switch 1022 to turn off the switch, thereby disconnecting the USB Type-C port 61010 from the battery charger 1035. This disconnection may be caused by an over-voltage condition, an over-current condition, or other conditions that may require disconnection of the USB Type-C port 1010 from battery charger 1035 for protection of circuits coupled to the USB Type C port 1010 or battery 1060 itself. Similarly, the on-chip discharge circuits may be implemented to adjust the slew rate in response to power consumption or other parameters.

Various embodiments of the techniques described herein for control the operation and state of power switches (such as power switch) when fault conditions are detected by providing control signals to the gate of the power switches These operations may be performed and/or controlled by hardware components, digital hardware and/or firmware, and/or combinations thereof. As used herein, the term "coupled to" may mean connected directly or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor(s) or the equivalents thereof, the instructions cause the device(s) to perform the described operations for VBUS voltage discharge described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A universal serial bus (USB) power delivery circuit comprising:
   a provider field effect transistor (FET) comprising:
      a source coupled to a first terminal,
      a drain coupled to a second terminal,
      a control terminal, and
      a passive pull-up circuit coupled between the first terminal and the control terminal, the passive pull-up circuit for disabling the provider FET in a normal operation, wherein normal operation occurs in the absence of a fault condition;
   a gate driver coupled to the control terminal of the provider FET for providing control signals to the control terminal, wherein the gate driver is programmable by control logic to provide control signals in response to system conditions, the control signals selected from a predetermined set of control signals corresponding to predetermined performance of the provider FET.

2. The USB power delivery circuit of claim 1, wherein the gate driver comprises an active pull-up circuit activated in response to a signal from a fault detection circuit.

3. The USB power delivery circuit of claim 2, wherein the fault detection circuit is configured to detect fault conditions that include at least one of an over-voltage condition, an over-current condition, and under-voltage condition, and a reverse current condition.

4. The USB power delivery circuit of claim 1, wherein the passive pull-up circuit is for deactivating the provider FET when the gate driver is disabled.

5. The USB power delivery circuit of claim 1, wherein the system conditions comprise at least one fault condition.

6. The USB power delivery circuit of claim 1, wherein an output of the gate driver is controlled with a digital signal.

7. The USB power delivery circuit of claim 1, wherein the digital signal is provided by a pulse-width modulated signal to control current through the provider FET.

8. The USB power delivery circuit of claim 1, wherein an output of the gate driver is controlled with an analog signal.

9. The USB power delivery circuit of claim 8, wherein the analog signal is a current.

10. A circuit for universal serial bus (USB) power delivery comprising:
   a first gate driver coupled to a first gate of a provider field effect transistor (FET), the first gate driver comprising an active pull-up circuit, and the provider FET comprising a passive pull-up circuit coupled between the first gate and a source terminal of the provider FET, the passive pull-up circuit for disabling the provider FET in a normal operation, wherein normal operation occurs in the absence of a fault condition; and
   a second gate driver coupled to a second gate of a consumer FET,
   wherein the first and second gate drivers comprise current control circuitry for providing analog control, and
   wherein the first and second gate drivers receive control signals from a control logic block, the control signals selected from a predetermined set of control signals corresponding to predetermined performance of the provider FET and the consumer FET.

11. The circuit for universal serial bus (USB) power delivery of claim 10, wherein the second gate driver comprises:
   a first FET gate driver comprising a drain coupled to a gate of the provider FET and a source; and
   a pulldown current control circuit coupled to the source, wherein the pulldown current control circuit is configured to alter a pulldown current on the first gate driver and the first PFET driver in response to control signals from a control circuit.

12. The circuit for USB power delivery of claim 11, wherein control signals from the control circuit correspond to a pulse-width modulation for digital control.

13. The circuit for USB power delivery of claim 11, wherein control signals from the control circuit correspond to a current signal for analog control.

14. The circuit for USB power delivery of claim 10, wherein the control circuit provides control signals to the first gate driver in response to a fault condition.

15. The circuit for USB power delivery of claim 10, wherein:
   the provider FET is coupled between a bulk capacitor and an output node; and
   the consumer FET is coupled between a charging circuit and the output node.

16. A universal serial bus (USB) power delivery system comprising:
   at least one voltage threshold detection module;
   a fault detection module;
   a first gate driver circuit, the first gate driver circuit coupled to a gate terminal of a first field effect transistor (FET), the gate terminal coupled to a passive pull-up circuit coupled to a source terminal of the first FET, the passive pull-up circuit for disabling the first FET in a normal operation, wherein normal operation occurs in the absence of a fault condition;
   a second gate driver circuit; and
   control logic for receiving signals from the at least one voltage threshold detection module and fault detection module and for providing control signals to the first and second gate driver circuits, the control signals for programming the first and second gate driver circuits with predetermined values corresponding to predetermined performance of the first FET coupled to the first gate driver circuit and a second FET coupled to the second gate driver circuit.

17. The USB power delivery system of claim 16, further comprising a fault response control module coupled to an output of the fault detection module and an input of the control logic.

18. The USB power delivery system of claim 16, further comprising a current sense detection module coupled to an input of the programmable fault detector.

19. The USB power delivery system of claim 16, wherein the at least one voltage threshold detection module comprises:
   a first voltage threshold detector module coupled to a first node of a provider FET corresponding to the first FET; and
   a second voltage threshold detector module coupled to a second node of the provider FET, the second node of the provider FET coupled to an output node of the USB power delivery system.

20. The USB power delivery system of claim 16, wherein the first gate driver circuit comprises an active pullup circuit.

21. The USB power delivery system of claim 16, further comprising a pulldown current control circuit coupled to the control logic, the pulldown current control circuit for providing a variable pulldown current to the first gate driver circuit and the second gate driver circuit in response to control signals from the control logic.

22. The USB power delivery system of claim 16, wherein the first gate driver circuit and the second gate driver circuit comprise NFETs.

* * * * *